United States Patent [19]

Aubert et al.

[11] Patent Number: 4,673,695

[45] Date of Patent: Jun. 16, 1987

[54] LOW DENSITY MICROCELLULAR FOAMS

[75] Inventors: James H. Aubert; Roger L. Clough, both of Albuquerque; John G. Curro, Placitas; Carlos A. Quintana; Edward M. Russick, both of Albuquerque, all of N. Mex.; Montgomery T. Shaw, Mansfield Center, Conn.

[73] Assignee: The United States of America as represented by the United States Department of Energy, Washington, D.C.

[21] Appl. No.: 785,436

[22] Filed: Oct. 8, 1985

[51] Int. Cl.$^4$ ............................ C08U 9/26; C08V 9/28
[52] U.S. Cl. ............................ 521/64; 210/500.28; 264/28; 264/49; 264/101; 521/61; 521/146
[58] Field of Search ............................ 521/64, 61, 146; 210/500.2; 264/28, 49, 101

[56] References Cited

U.S. PATENT DOCUMENTS

| | | | |
|---|---|---|---|
| 3,308,073 | 3/1967 | Kepple | 521/64 |
| 3,403,046 | 9/1968 | Schwacke, Jr. et al. | 117/102 |
| 3,812,224 | 5/1974 | Smith et al. | 521/64 |
| 3,839,516 | 10/1974 | Williams et al. | 264/41 |
| 4,118,449 | 10/1978 | Riude | 264/28 |
| 4,247,498 | 1/1981 | Castro | 264/41 |
| 4,430,451 | 2/1984 | Young et al. | 521/64 |
| 4,432,920 | 2/1984 | Ishikawa et al. | 264/49 |
| 4,519,909 | 5/1985 | Castro | 210/500.2 |

*Primary Examiner*—Morton Foelak
*Attorney, Agent, or Firm*—Armand McMillan; Albert Sopp; Judson R. Hightower

[57] ABSTRACT

Low density, microporous polymer foams are provided by a process which comprises forming a solution of polymer and a suitable solvent followed by rapid cooling of the solution to form a phase-separated system and freeze the phase-separated system. The phase-separated system comprises a polymer phase and a solvent phase, each of which is substantially continuous within the other. The morphology of the polymer phase prior to and subsequent to freezing determine the morphology of the resultant foam.

Both isotropic and anisotropic foams can be produced. If isotropic foams are produced, the polymer and solvent are tailored such that the solution spontaneously phase-separates prior to the point at which any component freezes. The morphology of the resultant polymer phase determines the morphology of the resultant foam and the morphology of the polymer phase is retained by cooling the system at a rate sufficient to freeze one or both components of the system before a change in morphology can occur. Anisotropic foams are produced by forming a solution of polymer and solvent that will not phase separate prior to freezing of one or both components of the solution. In such a process, the solvent typically freezes before phase separation occurs. The morphology of the resultant frozen two-phase system determines the morphology of the resultant foam.

The process involves subjecting the solution to essentially one-dimensional cooling. Means for subjecting such a solvent to one-dimensional cooling are also provided.

Foams having a density of less than 0.1 g/cc and a uniform cell size of less than 10 μm and a volume such that the foams have a length greater than 1 cm are provided.

16 Claims, 3 Drawing Figures

LOW DENSITY MICROCELLULAR FOAMS

The U.S. Government has rights in this invention pursuant to Contract Number DE-AC04-76DP00789 between the U.S. Department of Energy and AT&T Technologies, Inc.

BACKGROUND OF THE INVENTION

This invention relates to a process for preparing a microporous, low density foam and to foams made by the process.

Processes for the production of open-celled polymeric foam from a solution of polymer in a suitable solvent have been known for many years. Many of these processes involve phase inversion from a solution. In such a process, a homogenous polymer solution is cooled in order to bring about separation of the solvent from the polymer to form a continuous polymer matrix in which is dispersed discrete cells of solvent. Typically, the solvent is selected from a class of solvents which are good solvents at one temperature and poor solvents at a lower temperature. Controlled cooling of a solution comprising a polymer and such a solvent yields a polymer foam which, once the solvent has been removed by, e.g., freeze-drying, comprises essentially only polymer.

In general, such processes heretofore known in the art are not capable of producing polymeric foams of relatively high volume having both a small cell size and low density.

U.S. Pat. No. 4,519,909 discloses a process for the manufacture of microporous polymers. The process includes forming a solution of a synthetic thermoplastic polymer and a compatible liquid, allowing the solution to form a desired shape and subsequently cooling the solution in that shape at a rate and to a temperature such that thermodynamic non-equilibrium liquid-liquid phase separation is initiated. The cooling is continued until a solid results and, finally, at least a substantial portion of the liquid is removed from the resulting solid to form a microporous polymer. Although the process results in foams having relatively small cell size, the patent does not disclose foams having both a small cell size and low density. The patent discloses that the rate of cooling affects the absolute cell size of the resultant foam and that high cooling rates can be employed to produce a foam having a small cell size. However, in each instance where high cooling rates are achieved, only very small samples of solution can be cooled. Additionally, since the samples are cooled in "pans", the solution is not cooled in one-dimensional fashion. The pans do not have side and top walls of lower thermal conductivity than the bottom walls. Accordingly, substantial cooling through the side and top walls occurs. U.S. Pat. No. 4,247,498 presents a similar disclosure.

U.S. Pat. No. 3,308,073 discloses a process for the manufacture of porous polyolefin foams. This process does not result in a foam having both low density and small cell size. Additionally, the process cannot be used to produce foams from atactic polymers. Thus, e.g., polystyrene foams cannot be produced by this process if sublimable solvents are used.

U.S. Pat. No. 3,812,224 discloses another process for the production of porous polymeric foams wherein a solution comprising a polymer and a compatible liquid solvent is frozen to a crystalline state and the solvent is removed by freeze-drying. The resultant foam contains interconnecting cells which are not greater than 1,000 microns in width. Low density foams cannot be made by this process.

Foams having both a small cell size and relatively low density have been produced from specific polymers. For example, U.S. Pat. No. 4,430,451 discloses a microcellular, low density foam comprising poly(4-methyl-1-pentene) having a density of from about 10 to about 100 mg/cc and cell sizes of from about 10 to about 300 micrometers. The foam is produced by a phase inversion process simliar to those discussed above. However, foams having both low density and small cell size can be produced only if the polymer used is isotactic and only if a relatively viscous gel phase forms upon cooling. This gel phase is due to the isotactic nature of the polymer since isotactic polymers readily crystallize. Thus, the polymer itself forms an immobile phase which results from the characteristics of the polymer, not the process parameters employed. U.S. Pat. No. 4,118,449 discloses a similar process for the production of foams having a density of from 0.065 to $0.6 \times 10^3$ kg/m$^3$ and a cell size ranging from about 0.3 to about 2 microns. However, such processes cannot be used to produce foams having a small cell size and low density from polymer solutions which do not form a gel when cooled, e.g., polystyrene. Low density polystyrene foams made by conventional processes have cell sizes of 100-200 $\mu$m or greater.

As disclosed in "Preparation of Multishell ICF Target Plastic Foam Cushion Materials by Thermally Induced Phase Inversion Processes", J. Vac. Sci. Tech. 20 (4), April 1982, 1094–1097, Young, et al, water soluble, hydrogen bonding polymers (carboxymethylcellulose and dextran) can be used to prepare foams having a density of 50 mg/cc and an average cell size of 2 micrometers can also be produced by such processes.

All of the above references are hereby specifically and entirely incorporated by reference herein.

In general, low density foams have been difficult to produce because such foams are very fragile and large bodies of such foams have low structural integrity.

SUMMARY OF THE INVENTION

Accordingly, it is an object of this invention to provide a process for the preparation of microcellular low density foams having a nominal cell size of from 1 to 20 micrometers and a density of less than about 0.1 g/cc and a volume such that said foams have a length greater than about 1 cm in at least two dimensions.

It is a further object of this invention to provide a process for the production of such low density, microporous foams wherein anisotropic or isotropic foams can be selectively produced.

Yet another object of this invention is to provide a process for the production of low density, microporous foams wherein the resultant foams are of uniform morphology and substantially free of defects such as large voids and the like.

Yet another object of this invention is to provide a process for the production of low density, microporous foams of atactic polymers.

Yet another object of this invention is to provide a microporous, isotropic, atactic polymer foam having a density of less than about 0.1 g/cc, a mean cell size of less than about 20 $\mu$m and a volume such that the foam has a length greater than about 1 cm in at least 2 dimensions.

Upon further study of the specification and appended claims, further objects and advantages of this invention will become apparent to those skilled in the art.

These and other objects of this invention have been attained by providing a process for preparing a microporous, low-density foam having a nominal cell size of from about 1-20 micrometers and a density of less than about 0.1 g/cc comprising the steps of:

forming a homogeneous initial solution of a polymer in a solvent therefor at a temperature at which said polymer is essentially completely soluble in said solvent, cooling said solution at a rate such that said solution forms a phase-separated system comprising two distinct phases, each of which is continuous within the other and wherein one phase comprises essentially said polymer and the other phase comprises essentially said solvent and wherein the morphology of said polymer phase determines the morphology of the resultant foam, continuing said cooling at said rate such that said system retains essentially the same morphology it possessed at the point of phase separation and until said system is substantially entirely frozen, and removing said solvent to produce a foam, the improvement comprising placing said initial solution in a chamber capable of subjecting it to essentially one-dimensional cooling, and carrying out said cooling in one-dimensional fashion.

In accordance with another aspect of this invention, a microporous, isotropic, atactic polymer foam having a density of less than about 0.05 g/cc a mean cell size of less than about 20 μm and at least two dimensions greater than about 1 cm is provided.

In accordance with another aspect of this invention a microporous, anisotropic, atactic polymer foam having a density of less than about 0.1 g/cc, a mean cell diameter of less than about 20 μm and at least two dimensions greater than about 1 cm is provided.

Upon further study of the specification and appended claims, further objects and advantages of this invention will become apparent to those skilled in the art.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views, and wherein.

DETAILED DISCUSSION

Figure 1:
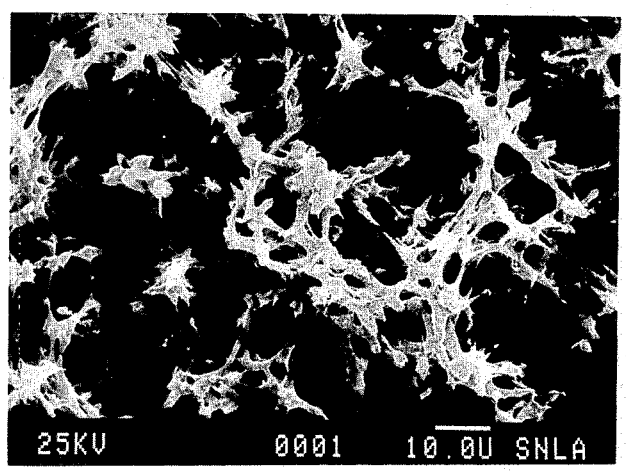
FIG. 1 is a Scanning Electron Micrograph of an isotropic polystyrene foam made in accordance with a process of this invention. For purposes of scale, the bar in the lower right portion of the drawing corresponds to a length of 10.0 μm.

The invention provides a process for preparing a microporous, low density foam having a nominal cell size of, e.g., from 1-20 μm and a density of less than about 0.1 g/cc. In general, the process comprises forming a solution of a polymer in a suitable solvent at a temperature where both the polymer and solvent are entirely soluble. The solution is then cooled rapidly until the solution is frozen, i.e., until both the polymer and the solvent are solid. The rate of cooling the solution is such that the polymer and solvent are allowed to phase-separate so that the mixture of polymer and solvent comprises two distinct phases, each of which is continuous within the other and wherein one phase comprises essentially only the polymer and the other phase comprises essentially only the solvent. Many prior art processes require either the solvent phase or the polymer or both to be viscous. In such processes, when the aforementioned solution becomes phase-separated, the high viscosity of the materials therein prevent further separation of the two phases into a more highly resolved phase-separated system, e.g., a system of two separate layers.

In contradistinction, in the process of the present invention it is not required that either the solvent or the polymer be highly viscous. In the present invention, the rate of cooling of the solution and the subsequent phase-separated system is extremely rapid such that once the phase-separated system is formed, it is immobilized and prevented from further resolution by freezing the polymer and/or solvent in the phase-separated system. The morphology of the system at the moment separation occurs is thereby retained. As used herein "resolution" refers to the process of separating the two phases into two discrete systems or layers, entirely distinct from each other and entirely immiscible with each other.

In processes of this invention the solution is cooled from essentially one direction or dimension. As used herein, "one-dimensional cooling" refers to cooling the solvent system from essentially one direction. Thus, the solution is subjected to cooling on only one side, as opposed to two or more sides, e.g., by using means to insulate the solution from heat transfer from any direction except the intended one.

The structure of the resultant foam is primarily dependent on the structure of the phase-separated system. The density of the resultant foam is primarily dependent on the original concentration of the polymer in the solution.

Both anisotropic and isotropic foams can be made by the processes of this invention. Whether the resultant foam is anisotropic or isotropic depends on the particular solvent system employed and on the solubility characteristics of the polymer in the solvent system.

In general, isotropic foams are produced in accordance with this invention by selecting a solvent for the polymer such that the solution of the polymer in the solvent behaves as a theta solution. Such solutions exhibit a theta point at a temperature at which binary thermodynamic interactions are zero. Theta solutions are further discussed in *Polymer Handbook*, Brandrup et al, Second Edition (1975). In general, for such solutions, the solvent and polymer system is one in which the polymer will separate into a phase which is separate from the solvent at a temperature higher than that at which the solvent freezes (liquid/liquid separation).

In the production of an isotropic foam according to a process of this invention, a solution of polymer and suitable theta solvent is prepared at a temperature at which the solution is homogeneous. The solution is then rapidly cooled to a temperature at which the polymer and solvent undergo spontaneous liquid/liquid-phase separation. At this temperature, the phase separation occurs without nucleation. It is believed that in such processes of the invention, phase separation occurs by way of spinodal decomposition. As used herein, nucleation refers to the development of discrete particles of solvent which form randomly and are not interconnected. By cooling the theta system to a temperature at which spontaneous liquid phase separation occurs, without nucleation, a bicontinuous phase system results. In such a system, the solvent and the polymer are separate phases but are continuous within each other, i.e., neither phase is discontinuous or disperse.

In the processes of this invention, the initial solution is cooled very rapidly, e.g., on the order of 50° C./minute or higher. In general, the solution is cooled as quickly as possible. If an isotropic foam is desired, the solvent for the polymer is selected such that the polymer/solvent system forms a theta solution as discussed above. The solution is then rapidly cooled or quenched to a temperature at which spontaneous phase-separation occurs as discussed above. The morphology of the polymer phase in such a phase-separated system determines the morphology of the resultant foam. Throughout this process the cooling is continued until the solvent and/or the polymer become frozen. While the system is still thus frozen, the solvent is removed. In a preferred embodiment of this invention, the solvent is removed by freeze-drying, i.e., by sublimation under vacuum. The result is a low density, microporous foam exhibiting isotropic properties. The cell size of the resultant foam can be less than 1 $\mu$m if cooling is sufficiently rapid to immobilize the initially formed, phase-separated system.

When the initial solution of polymer and solvent is prepared, it generally contains dissolved gases, e.g., air. It is desirable to remove these gases to avoid the subsequent formation of voids or other defects which would otherwise result when the dissolved gases come out of solution during freezing. The dissolved gases are preferably removed by subjecting the solution to vacuum. A vacuum of from 50–500 mTorr is generally sufficient to achieve the desired result. To avoid partial freezing or phase-separation of the system as a result of lower temperatures due to solvent evaporation during degassing, the solution is preferably heated during or after the degassing step. Preferably, the solution is maintained at a constant temperature which is high enough to allow removal of dissolved gases, but lower than the boiling point of the solvent or polymer.

As discussed above, if an isotropic foam is desired, the solvent or cosolvent system in which the polymer is dissolved must be one in which the polymer will phase-separate at a temperature higher than that at which the solvent freezes. A large choice of solvents exists satisfying this requirement for the polymers useful in this invention. For commercially important polymers, suitable solvents can be found from published lists of theta solvents, e.g., in the *Polymer Handbook* as discussed above.

An example of a particular theta solution is a solution of polystyrene in cyclohexane. The theta temperature of the system is 34.5° C. The freezing point of cyclohexane is 6.5° C. When a solution of polystyrene and cyclohexane is rapidly cooled to a temperature well below the freezing point of cyclohexane the solution first separates into a liquid/liquid system wherein the polystyrene phase and the cyclohexane phase are discrete, each continuous within the other. Once initial spontaneous phase separation occurs, because the system is cooled rapidly, the phase separation process does not continue and the morphology of the polymer remains substantially constant. Thus, under rapid cooling the phase-separated system is essentially immobilized by the solvent freezing. Once frozen, the cyclohexane is removed, e.g., by freeze drying.

In addition to polystyrene, various other polymers can be employed, e.g., polymethylmethacrylate. It is preferable that the polymer be atactic, however, the process of this invention is applicable to a wide range of polymers, e.g., all of the polymers disclosed in the patents discussed above. The invention is especially applicable to low viscosity solvents or polymer solutions.

By using well characterized polymers, i.e., polymers of essentially uniform molecular weight, the foam morphology can be readily analyzed and correlated to the phase characteristics of the initial solution.

In general, the density of the resultant foam is a function of the concentration of polymer in the solvent solution. Generally, when polymer concentrations are relatively low, the density of the resultant foam is correspondingly relatively low. Conversely, when the concentration of polymer is relatively high, the density of the resultant foam is correspondingly relatively high.

Thus, foams of various densities can be produced according to the process of this invention. There is no preferred upper or lower limit of concentration of polymer in the solution. In general, however, the highest practical concentration is dependent on the desired density of the resultant foam. The lowest practical concentration is dependent on the lowest concentration at which the polymer molecules will intertwine to form a polymeric structure.

In general, when polymers having a narrow molecular weight distribution are employed, the lower limit of the density of the resulting foam is dependent on the molecular weight of the polymer. To produce a low density foam, the molecular weight must be sufficiently high that at the low polymer concentrations necessary to produce low density foams, the polymer molecules will intertwine or coil-overlap to form a polymeric structure. The lowest molecular weights practical in processes of this invention are on the order of $10^5$. When higher molecular weight polymers are used, less concentrated polymer solutions can be employed to yield lower density foams.

Polystyrene foams are exemplary of foams which can be made by the process of this invention. In general, for polystyrene foams, the theoretical density of the resultant foam made by the process of this invention may be approximated by the formula: $3x/2y$, wherein x is the number of parts by weight of polystyrene and y is the number of parts by weight of solvent. Thus, for example, if a polystyrene foam having a density of about 0.1 g/cc is desired, the concentration of the polymer in the initial solution should be about 1/15 by weight. If a polystyrene foam having a density of about 0.05 g/cc is desired, the concentration of the initial solution should be about 0.5 part by weight of polymer to about 15 parts by weight of solvent. Similarly, if a polystyrene foam having a density of from about 0.01–0.02 g/cc is desired, about 0.1–0.2 part of polymer and about 15 parts of solvent should be present in the initial solution.

It has been found in practice that the cell size of the resultant foam is dependent on the rate at which the initial solution is cooled. As discussed above, if a theta solution is employed, the solution must be cooled sufficiently rapidly that the phase-separation occurs spontaneously and that this initial phase-separation is substantially immobilized by subsequent freezing of one or both components. If the rate of cooling is not sufficiently high, the phase-separation occurs before the spontaneous phase-separation would occur. Undesirable nucleation occurs in such circumstances. It is also important that the temperature to which the system is cooled be sufficiently below the theta point that once spontaneous phase-separation occurs, the resultant system is substantially immobilized. Thus, if the rate of cooling is low, and the temperature to which the phase-separated system is finally cooled is relatively high, nucleated phase-separation will occur with discrete droplets of solvent initially forming which continue to grow in size resulting in a large cell foam. Similarly, if the final temperature to which the system is cooled is below the theta temperature, but the system is cooled relatively slowly, the resultant phase- separated system will form solvent nuclei which continue to grow in size until one or both components of the system is frozen.

Whether the resultant foam is anisotropic or isotropic is dependent on the type of solvent used for the polymer. As discussed above, to produce an isotropic foam, the polymer must be dissolved in a solvent in which the polymer and the solvent form a theta solution. For polystyrene, suitable theta solvents include cyclohexane, mixtures of dioxane and isopropanol, e.g., mixtures comprising from about 55–60% dioxane and 40–45% isopropanol, mixtures of benzene and isopropanol and mixtures of benzene and methanol.

Anisotropic foams can be made by the processes of this invention by using a solvent in which the polymer and solvent form a solution which does not form a phase-separated system prior to the point at which one or both components of the solution freeze. In such a process, a homogeneous solution of polymer and solvent is prepared, with concentrations as discussed above, and the solution is cooled rapidly until one or both components of the solution freeze. When such a solution is cooled, the solvent will begin to crystallize out of solution before the solution begins to otherwise phase-separate. When such a solution is subjected to one-dimensional cooling, the solvent crystals grow directionally, i.e., away from the direction in which heat is being conducted out of solution, resulting in a frozen polymer foam having a directional or anisotropic morphology. When subjected to freeze-drying, the resultant foam is anisotropic.

If the polymer comprises polystyrene, suitable solvents for the production of anisotropic polystyrene foams include benzene, dioxane, and mixtures of dioxane and isopropanol, e.g., mixtures comprising about 80% dioxane and about 20% isopropanol.

Particularly suitable means for subjecting the initial solution to essentially one dimensional cooling comprises a generally rectangular chamber or mold wherein the mold chamber has a sheet-like configuration. Thus, in two dimensions the chamber is relatively long and wide while in the third (thickness) dimension the chamber is filled with polymer solution to only a relatively shallow depth. Thus, the interior of the chamber is essentially in the form of a three-dimensional rectangle. Two dimensions of the rectangle, i.e., length and width, are greater than 1 cm. The third dimension, i.e., height or depth is filled with polymer solution generally to less than 1 cm. If the chamber is filled to a height greater than about 1 cm, the resulting foam generally will contain large voids.

In general, the chamber has a top wall and bottom wall, each of relatively large area, and four side walls of relatively small area. Advantageously, the bottom wall comprises a highly conductive material, e.g., copper sheet and the top and side walls comprise relatively non-conductive, highly insulating materials, e.g., epoxy or the like. When such a mold is placed in a cold temperature environment, heat is conducted from the interior thereof only through the conductive bottom sheet. Thus, the contents of the mold are subjected to essentially one dimensional cooling.

Advantageously, the side walls of the mold have a thermal conductivity which is close to that of the solution. For example, if the organic solutions to be cooled have a thermal conductivity ranging from about 0.0003–0.0004 cal/sec/cm/° C., the side walls of the mold should have a conductivity in this same range. Epoxy has a thermal conductivity in that general range. In some applications, glass can also be used. Glass has a thermal conductivity of about three times that of epoxy. The bottom wall of the mold should be as thin as possible and should be formed from material having the highest possible thermal conductivity. Copper sheet has been found particularly suitable for this purpose. Such copper sheet has a thermal conductivity of 1 cal/sec/cm/° C.

In general, by one-dimensional cooling, it is meant that the solution is cooled from essentially only, e.g., the bottom towards essentially only the top in such a mold. If the side walls of the mold have a thermal conductivity as discussed above, one-dimensional cooling results when the bottom of such a mold is placed on an extremely cold surface because the temperature of the side walls is never lower than the temperature of the solution being cooled. In contradistinction, prior art cooling "pans" are fabricated of metal. Such pans, when placed on a cold surface, cool a solution therein from the bottom and sides. Such "pans" are therefore not capable of subjecting a solution therein to essentially one-dimensional cooling.

The top wall of the mold is provided with a vacuum port which in turn is provided with a valve which can be opened and closed. This allows the mold to be placed under vacuum when the vacuum port is connected to a source of vacuum so that dissolved gases can be removed from the initial solution and so that once the solution is frozen, the frozen solvent can be removed therefrom by sublimation or freeze-drying.

In a process of this invention, a solution of polymer and suitable solvent is prepared and poured into the mold. The mold is preheated uniformly so that the solution is brought to a temperature at which dissolved gases can be readily removed by vacuum. The vacuum port is then connected to a source of vacuum and the valve is opened, allowing dissolved gases to be removed from the solution. Thereafter, heat may be supplied to the mold to redissolve any polymer which may have phase- separated during the degassing operation. Alternatively, heat may be supplied during the degassing operation to prevent phase- separation from occuring prematurely. Once the dissolved gases are removed, the valve in the vacuum port is closed and the mold is placed on a cold plate at, e.g., −100° C. such that the conductive wall of the mold is in contact with the cold plate. Heat is thereby conducted out of the solution in substantially one dimension thereby eliminating thermal stresses which otherwise could create voids or cracks in the frozen solution. Once the polymer/solvent system is frozen, the valve in the vacuum port is opened and the frozen polymer/solvent system is subjected to a source of vacuum. The solvent is thereby removed by freeze-drying or sublimation. Alternatively, the solvent could be removed by other methods, e.g., extraction, etc.

The foams produced in accordance with this invention have an over-all structure which is essentially sheet-like. Thus, foams of this invention have a volume such that they have a length and width greater than 1 cm.

The foams produced in accordance with this invention have various utilities. Thus, the isotropic foams of this invention can be used in the fabrication of, e.g, inertial confinement laser fusion targets. Polystyrene foams produced in accordance with this invention, having a density of about 0.05 g/cc and a cell size of less than about 1 $\mu$m, are particularly suitable for this purpose. The anisotropic foams can be used to manufacture, e.g., artificial blood vessels and other prosthesis. Both the anisotropic and isotropic foams of this invention can be used wherever open-celled, low density foams are desired, e.g., as insulation, etc. The foams of this invention are also useful as, e.g., filters, catalytic substrates and model porous media.

The foams of this invention exhibit good machinability and are thus readily adaptable to specific end uses.

To be useful in most applications, such foams must have a volume such that, in at least two dimensions, the foam has a length greater than about 1 cm. Thus, such foams must be substantially sheet-like in over-all dimension.

The foams of this invention can also be "loaded" with various additives, e.g., fire retardants, stabilizers, dies, medicinals, odor agents and the like. If it is desired to prepare a foam having an additive incorporated therein, the additive is advantageously added to the initial solution at the time the initial solution is prepared. The additive can be added in various concentrations, from low concentration, e.g., 0.0001%, up to the same concentration at which the polymer is present in solution. Thus, if the polymer is present in concentrations of, e.g., 1 part by weight of polymer to 15 parts by weight of solvent, the additive can be present in a concentration of up to 1 part by weight of additive to 15 parts by weight of solvent. The main requirements on the additives are that they be a solid at room temperature, that they not plasticize the polymer extensively, and that they be nonvolatile in order that they not volatilize in the freeze-drying process. For low density foams it is also important that the additives be of low molecular weight, since the additive adds weight but no strength to the foam. Volatile additives could also be employed if a different method were used to remove the solvent from the frozen solution, such as extraction rather than freeze-drying. One of the advantages of incorporating additives into the foams in the manner described is that the additives become finely dispersed in the foam. This is because before freezing of the solution the additive is in solution and therefore molecularly dispersed. After the foam is made the additives are dispersed uniformly on length scales greater than the cell size.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

PREPARATION OF ISOTROPIC MICROCELLULAR POLYSTYRENE FOAMS

EXAMPLE 1

A homogenous solution of polystyrene in cyclohexane was prepared by dissolving 1.38 grams of polystyrene, having a substantially uniform molecular weight of $1.8 \times 10^6$ in 75 cc of cyclohexane at 50° C. A mold adapted to subject the solution to essentially one dimensional cooling was preheated to 50° C. The mold comprised top and bottom walls measuring 1¾ inch×5¼ inch, end walls measuring 1¾ inch×1 inch and side walls measuring 5¼ inch×1 inch. The bottom wall of the mold comprised a copper sheet having a thickness of about ⅛ inch. The top and side walls comprised epoxy and/or other insulating material. The mold was provided at the top portion thereof with a vacuum port having a valve therein. The solution was then poured into the preheated mold. The solution was then degassed as follows. The vacuum port was connected to a source of vacuum, e.g, a roughing pump, and the valve was opened to subject the solution to vacuum and thereby remove dissolved air and other gases from the solution. The valve was then closed and disconnected from the vacuum source. The interior of the mold was therefore still under vacuum. The mold was then placed in an oven at a temperature of 50° C. for 15 minutes to redissolve any polymer which might have come out of the solution during the degasing step. The mold was then placed on a copper cold plate such that the copper wall of the mold was in contact with the cold plate, the cold plate having been previously cooled to −100° C. The mold was left in contact with the cold plate for approximately 10 minutes during which time the sample was frozen. The vacuum within the mold was then released by opening the valve in the vacuum port and the mold containing the frozen sample was placed in a glass vacuum jar. This jar was itself evacuated by the roughing pump for eight hours during which time the frozen solution sublimed. The dry foam was then removed from the mold. The resultant foam had a density of 0.037 g/cc and an average cell size of about 10 $\mu$m. The morphology was very open and "strut"-like.

Comparative Example A

A homogenous solution of polystyrene in cyclohexane was prepared by mixing 7.06 g of polystyrene having a uniform molecular weight of $6.0 \times 10^5$ in 80 cc of cyclohexane at 50° C. The solution was then poured into the mold and subjected to degassing, cooling and freeze-drying as described in Example 1. The resulting foam was an open-celled foam with an average cell size of 10 $\mu$m and a density of 0.138 g/cc.

EXAMPLE 3

A solution of polystyrene in a cosolvent mixture of 55% dioxane and 45% isopropanol was prepared by mixing 1.82 g of polystyrene having a uniform molecular weight of about $1.8 \times 10^6$ with 80 cc of the cosolvent. The solution was then poured into the preheated mold described in Example 1 and subjected to cooling as described in Example 1. The valve in the vacuum port was thereafter opened and the mold was placed in a glass vacuum jar which was pre-cooled to $-80°$ C. The vacuum jar was evacuated by a roughing pump for 48 hours during which time the frozen solvent sublimed. During this time the vacuum jar was placed in a temperature-controlled bath which was controlled for 4 hours at $-80°$ C., raised to $-60°$ C. during a 2 hour transition period, maintained at $-60°$ C. for 16 hours, raised to $-20°$ C. over a period of 8 hours, maintained at $-20°$ C. for 16 hours and then heated to room temperature over a period of 2 hours. The resulting foam had a density of 0.05 g/cc and an average cell size of about 10 $\mu$m. The morphology was very open and "strut"-like. The resultant foam is shown in FIG. 1.

EXAMPLE 4

Figure 2:
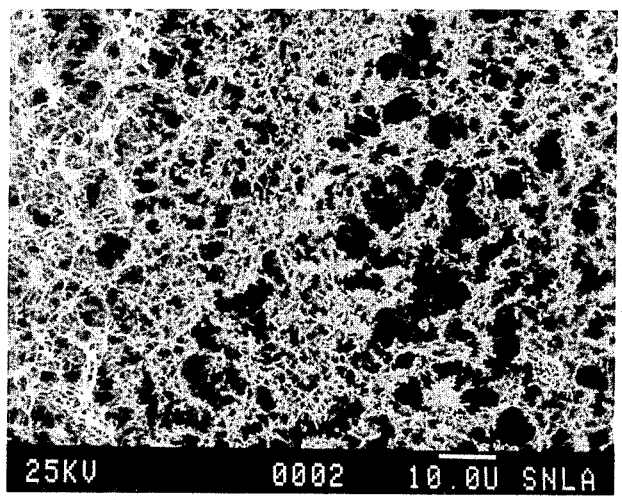
FIG. 2 is a Scanning Electron Micrograph of an isotropic polystyrene foam made by a process of this invention. For purposes of scale, the bar in the lower right corner of the figure corresponds to a length of 10.0 μm.

A solution of polystyrene in a mixture of dioxane and isopropanol was prepared by mixing 1.77 g of polystyrene and 80 cc of a cosolvent comprising 60% dioxane and 40% isopropanol at 50° C. The resultant solution was then subjected to degassing, cooling and freeze-drying as described in Example 3. The resulting foam had a density of 0.044 g/cc and an average cell size of about 1 $\mu$m. The morphology was very open and "strut"-like. The resultant foam is shown in FIG. 2.

EXAMPLE 5

A solution of polystyrene and a cosolvent comprising 65% benzene and 35% isopropanol was prepared by mixing 1.77 g of polystyrene and 80 cc of solvent at 50° C. The resulting foam was then subjected to degassing, cooling and freeze-drying as described in Example 3. The resulting foam had a density of 0.042 g/cc and an average cell size of about 10 $\mu$m. The morphology was very open and "strut"-like.

EXAMPLE 6

A solution of polystyrene and a cosolvent comprising 80% benzene and 20% methanol was prepared by mixing 1.77 g of polystyrene and 80 cc of solvent at 50° C. The solution was then subjected to degassing, cooling and freeze-drying as described in Example 3. The resulting foam had a density of 0.045 g/cc and an average cell size of about 10 $\mu$m. The morphology was very open and "strut"-like.

PREPARATION OF ANISOTROPIC MICROCELLULAR POLYSTYRENE FOAMS

Comparative Example B

Figure 3:
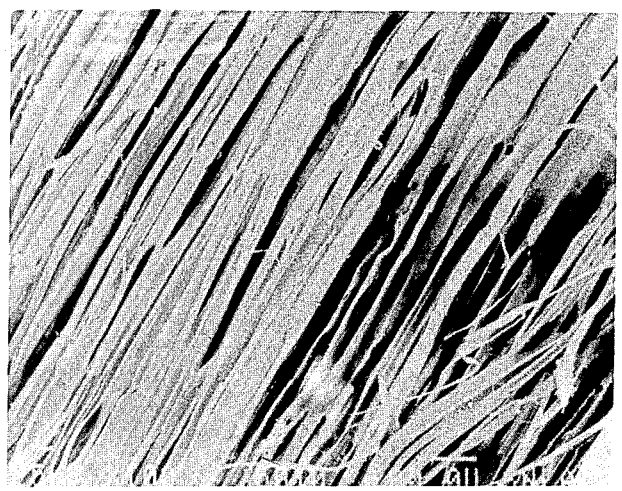
FIG. 3 is a Scanning Electron Micrograph of an anisotropic foam made by the process of Comparative Example B described herein. For purposes of scale, the bar in the lower right corner corresponds to a length of 100.0 μm.

A solution of polystyrene in benzene was prepared by mixing 2.60 g of polystyrene having a uniform molecular weight of $1.8 \times 10^6$ with 80 cc of benzene. The resultant solution was degassed, cooled and freeze-dried as described in Example 1. The resulting foam had a density of 0.05 g/cc and was anisotropic. The morphology of the foam was similar to that of a corrugated sheet, e.g., honeycomb-like. The cell diameter was less than 100 $\mu$m. The resultant foam is shown in FIG. 3.

EXAMPLE 8

A solution of polystyrene in dioxane was prepared by mixing 2.60 g of polystyrene having a uniform molecular weight of about $1.8 \times 10^6$ in 80 cc of dioxane. The resulting solution was degassed, cooled and freeze-dried as described in Example 1. The resulting foam had a density of 0.05 g/cc and was anisotropic. The morphology was similar to the foam of Example 7, however the foam had a cell diameter of about 20 $\mu$m.

EXAMPLE 9

A solution of polystyrene in a cosolvent comprising 80% dioxane and 20% isopropanol was prepared by mixing 2.60 g of polystyrene having a uniform molecular weight of about $1.8 \times 10^6$ in 80 cc of cosolvent. The resultant solution was then subjected to degassing, cooling and freeze-drying as described in Example 3. The resulting foam had a density of 0.05 g/cc and was anisotropic. The resultant foam was more porous than that of Example 8, having a cell diameter of about 20 $\mu$m.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is

1. In a process for preparing a microporous, low-density foam having a nominal cell size of from about 1-20 micrometers and a density of less than about 0.1 g/cc comprising the steps of:

forming a homogeneous initial solution of a polymer in a solvent therefor at a temperature at which said polymer is essentially completely soluble in said solvent, cooling said solution at a rate such that said solution forms a phase-separated system comprising two distinct phases, each of which is continuous within the other and wherein one phase comprises essentially said polymer and the other phase comprises essentially said solvent and wherein the morphology of said polymer phase determines the morphology of the resultant foam, continuing said cooling at said rate such that said system retains essentially the same morphology it possessed at the point of phase separation and until said system is substantially entrirely frozen, and removing said solvent to produce a foam, the improvement comprising placing said initial solution in a chamber capable of subjecting it to essentially one-dimensional cooling, and carrying out said cooling in one-dimensional fashion which comprises cooling the solvent system from essentially one direction so that the solution is subjected to cooling on only one side, as opposed to two or more sides, and means are provided to insulate the solution from heat transfer from any direction except the intended one.

2. A process of claim 1 wherein dissolved gases are removed from said solution by subjecting said solution to vacuum prior to subjecting said solution to one-dimensional cooling.

3. A process of claim 2 wherein said solvent is removed by sublimation.

4. A process of claim 1 wherein said chamber is essentially in the form of a three-dimensional rectangle, two dimensions of which have a length greater than about 1 cm and the chamber is filled with polymer solution to a depth not greater than about 1 cm.

5. A process of claim 4 further comprising:
cooling said initial solution at a rate such that said solution forms a phase-separated system comprising two distinct substantially liquid phases, each of which is substantially continuous within the other,
wherein said polymer is an essentially atactic polymer, and said solution has a theta temperature above the freezing point of said solution,
whereby the resultant foam is isotropic.

6. A process of claim 4 further comprising:
cooling said initial solution at a rate such that said solution forms a phase-separated system comprising two distinct phases, each of which is substantially continuous within the other,
wherein said solution does not form a liquid/liquid phase-separated system and
wherein said polymer phase is substantially liquid and said solvent phase is substantially solid, and wherein the resultant foam is essentially anisotropic, and wherein said initial solution is not a theta solution.

7. A process of claim 5 wherein said polymer is polystyrene and said solvent is cyclohexane.

8. A process of claim 5 wherein said polymer is polystyrene and said solvent is a mixture of dioxane and isopropanol.

9. A process of claim 5 wherein said polymer is polystyrene and said solvent is a mixture of benzene and isopropanol.

10. A process of claim 5 wherein said polymer is polystyrene and said solvent is a mixture of benzene and methanol.

11. A process of claim 6 wherein said polymer is polystyrene and said solvent is benzene.

12. A process of claim 6 wherein said polymer is polystyrene and said solvent is dioxane.

13. A process of claim 6 wherein said polymer is polystyrene and said solvent is a mixture of dioxane and isopropanol.

14. A process of claim 13 wherein said mixture is about 80% dioxane and about 20% isopropanol.

15. A process of claim 3 further comprising the addition of a non-sublimable additive to said solution.

16. A process of claim 4 wherein said rate of cooling of said solution is at least under 50° C./min.

* * * * *